E. M. CHAPMAN & C. E. COWAN.
ELEVATING TRUCK.
APPLICATION FILED MAR. 17, 1914.
1,135,765.
Patented Apr. 13, 1915.
2 SHEETS—SHEET 1.
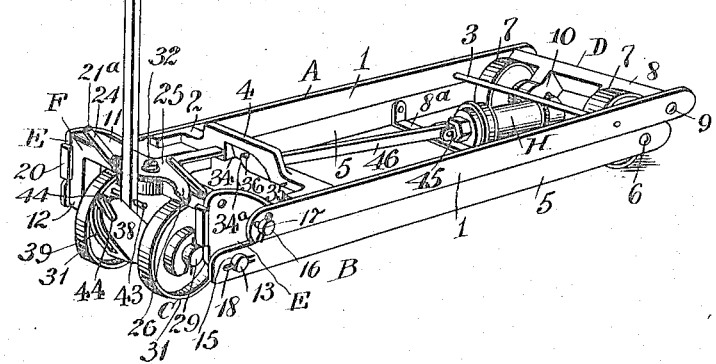
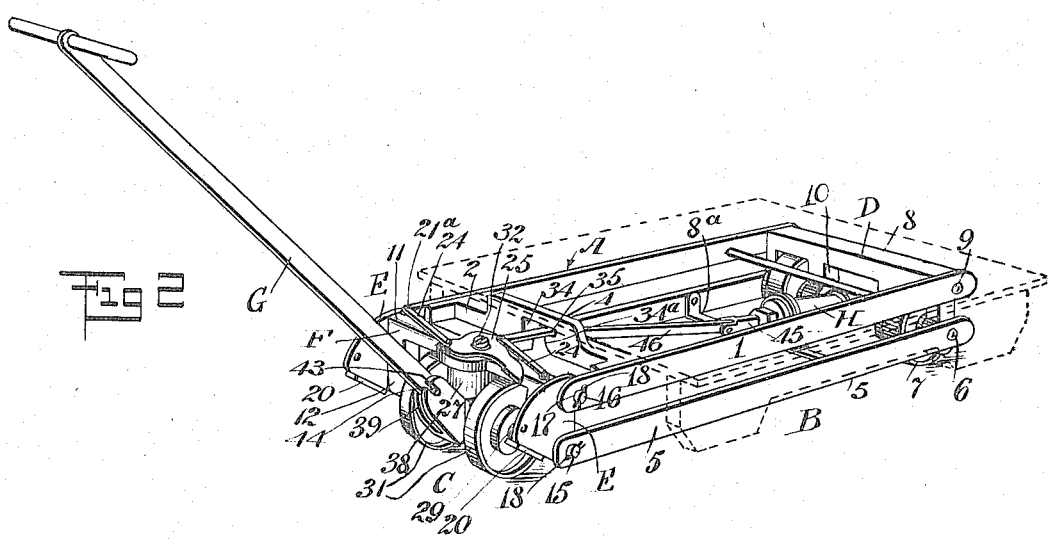
WITNESSES
C. J. Hachenberg.
C. Bradway.
INVENTORS
Eugene M. Chapman
Charles E. Cowan
BY
Munn Co.
ATTORNEYS

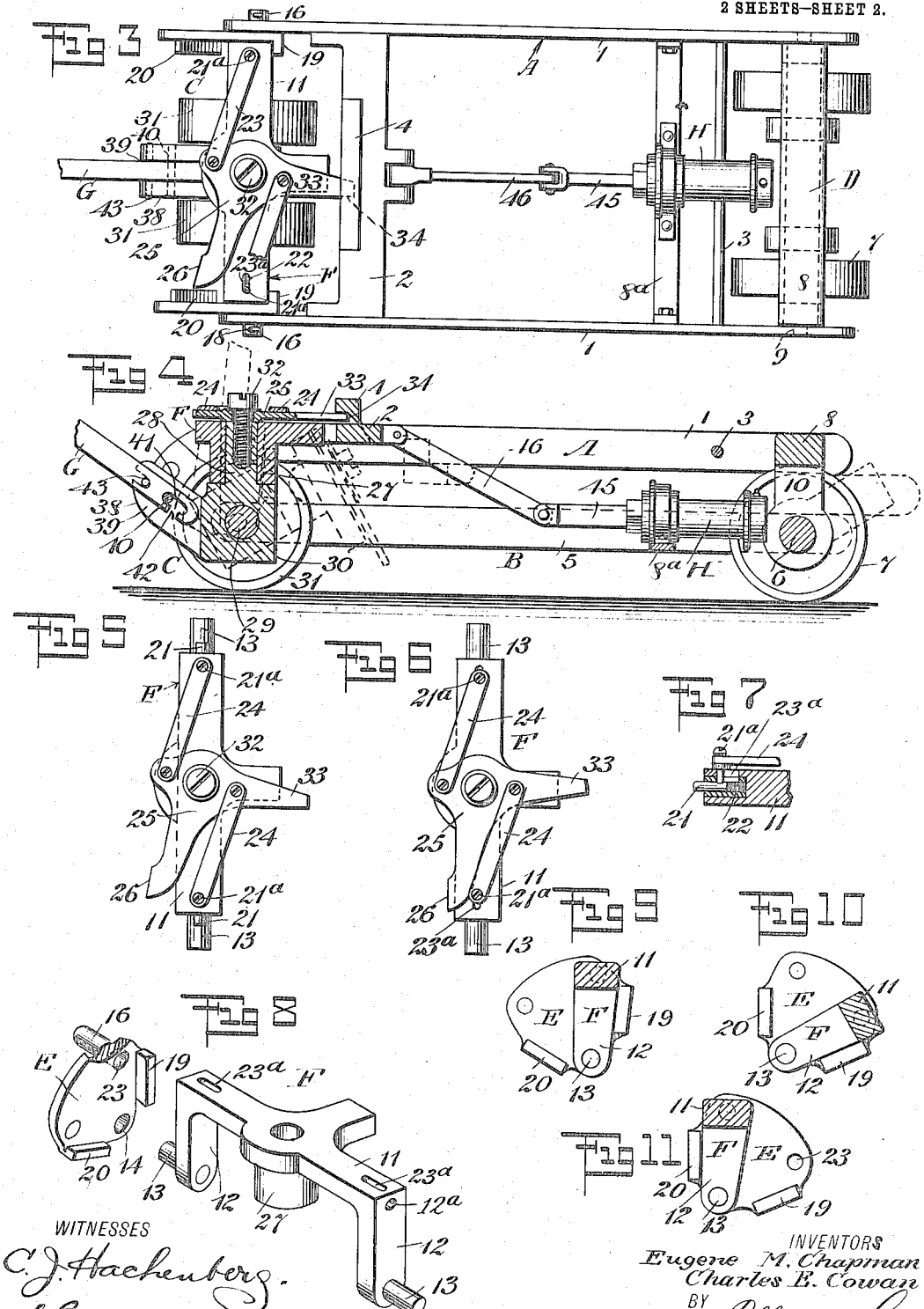

UNITED STATES PATENT OFFICE.

EUGENE M. CHAPMAN AND CHARLES E. COWAN, OF HOLYOKE, MASSACHUSETTS.

ELEVATING-TRUCK.

1,135,765.　　　　　Specification of Letters Patent.　　Patented Apr. 13, 1915.

Application filed March 17, 1914. Serial No. 825,256.

*To all whom it may concern:*

Be it known that we, EUGENE M. CHAPMAN and CHARLES E. COWAN, citizens of the United States, and residents of Holyoke, in the county of Hampden and State of Massachusetts, have invented a new and Improved Elevating-Truck, of which the following is a full, clear, and exact description.

This invention relates to elevating trucks of that type including a link supported platform and means whereby the downward movement of the handle will elevate the platform and the upward movement will lower the platform.

The general objects of the present invention are to improve and simplify the construction and operation of elevating trucks of the character referred to so as to be of durable and substantial design, comparatively inexpensive to manufacture, and so constructed that the platform can be easily and quickly raised or lowered and the truck steered with facility.

A more specific object of the invention is the provision of a novelly arranged and constructed elevating device at the front of the truck, which is adapted to coöperate with front links of special construction between the front end of the platform and the under structure of the truck, whereby the platform can be raised or lowered, said elevating device being connected with a fore carriage by a king bolt construction in which the king bolt will occupy a vertical position when the platform is lowered, so that the truck can be readily steered by the usual tongue or handle.

Still another object of the invention is the provision of a simple and effective locking device for automatically locking the platform in raised position and for locking the elevating device to the front links of the truck, said locking means being released by the operator pressing a pedal to permit the platform to drop under the weight of the load sustained thereby without the necessity of moving the handle upwardly.

With such objects in view, and others which will appear as the description proceeds, the invention comprises various novel features of construction and arrangement of parts such as will be set forth with particularity in the following description and claims appended hereto.

In the accompanying drawings, which illustrate one embodiment of the invention, and wherein similar characters of reference indicate corresponding parts in all the views, Figure 1 is a perspective view of the truck with the platform in lowered position; Fig. 2 is a similar view showing the platform raised, as when carrying a load to be transported; Fig. 3 is a plan view of the truck; Fig. 4 is a vertical longitudinal section, showing in full lines the platform raised and in dotted lines the platform lowered; Fig. 5 is a plan view of the elevator and the locking mechanism carried thereby, with such mechanism in locking position; Fig. 6 is a similar view showing the locking mechanism in released position; Fig. 7 is a detail sectional view showing the locking bolt for connecting the elevator with one of the front links; Fig. 8 is a perspective view of the elevating device and one of the front links shown removed therefrom; and Figs. 9 to 11 inclusive are sectional views showing the various operative relations of the elevator to the front links.

Referring to the drawings, A designates a platform and B the undersupporting structure of the truck. The platform comprises side bars 1 and front and rear cross bars 2 and 3 which are rigidly secured to the side bars. The front cross bar or member 2 has an upwardly extending flange 4 which serves to prevent the positioning of a load on the platform too far forwardly. The under supporting structure comprises side bars 5 which have their rear ends connected with an axle 6 that passes through and holds rear wheels 7. The side bars or reaches 5 may be connected by one or more cross members 8ª. A fore carriage C is connected with the front part of the under structure of the truck so as to support the same, the connecting means being of special design, as it includes devices for effecting the raising and lowering of the platform A. The rear end of the platform is connected by a link frame D with the rear axle 6, said frame D being in the form of a bar 8 which is pivotally connected at its ends 9 with the side bars 1 of the platform, and depending from the bar 8 of the link frame D are members 10 through which the rear axle 6 extends, whereby the said frame D forms means for linking the rear end of the platform with the under structure B, and this frame D is adapted to swing rearwardly on the axle 6 as a center during the lowering movement of the platform, and it swings upwardly to an approximately vertical plane when the platform is raised.

The front portions of the under structure B and platform A are connected together by links E which are in the form of sector plates constructed as shown in Figs. 8 to 11 inclusive. The links E set in between the bars 1 of the platform and reaches 5, and between these links is disposed an elevating device F which is constructed as shown in Fig. 8, it being a horizontal bar 11 having depending arms 12 provided at their lower ends with pivot studs 13. These studs pass through openings 14 in the lower portions of the front links E, and these studs are long enough to pass through the openings 14 and through openings 15 in the forward ends of the reaches 5. The links E have at their upper portions outwardly extending studs 16 which pass through openings 17 in the side bars 1 of the platform. Suitable means, such as cotter pins 18, may be inserted through the outer ends of the pivot studs 13 and 16, as shown in Figs. 1 and 2, to hold the parts together. On the inner faces of the sectors or links E are stops 19 and 20 so disposed with respect to each other that the arms 12 of the elevating device will lie between them and have a swing of about forty-five degrees. In the ends of the bar 11 of the elevator are bolts 21, each being normally urged outwardly by a spring 22, as shown in Fig. 7, and these bolts are adapted to enter recesses or to engage with equivalent means 23 on the inner faces of the links E, when the elevator is in engagement with the rear stops 19 on the links E. The bolts 21 thus lock the links to the elevator and they will move with the latter as it swings down rearwardly and up forwardly on an axis formed by the pivot lugs 13. These bolts are connected by studs 21ª with links 24 which are disposed over the bar 11 of the elevator F, and these links are in turn connected with a foot-operated member or pedal 25 which is pivotally mounted on the top of the elevator, and this device 25 has an extremity 26 located forwardly of the elevator and is adapted to be engaged by the foot of the operator so as to be pressed rearwardly, and in so doing the links 24 are drawn inwardly so as to retract the bolts 21 and thereby unlock the elevator F from the links E. The studs 21ª of the bolts 21 extend through slots 23ª, Figs. 7 and 8, in the ends of the bar 11, and the bolts pass out through openings 12ª so as to engage in the recess 23 of the links E. The elevator has a vertical centrally disposed tubular bearing or boss 27 depending from the under side of the bar 11 of the elevator, and into this bearing extends the king pin 28 of the fore carriage C. The fore carriage comprises an axle 29 passing through an axle block 30 from which latter extends the king bolt 28, and on the ends of the axle 29 are the front wheels 31 of the truck. These wheels are located close together and between the depending arms 12 of the elevator and are capable of turning through approximately one hundred and eighty degrees, so that the truck can make short turns. The king pin is held in the elevator F by the bolt-operating lever or pedal 25 and a screw 32 which extends through this lever 25 and screws into the king bolt, as shown in Fig. 4, the screw serving as a pivot for the foot lever 25. In order to hold the platform in raised position this foot lever 25 has a rearward extension or tongue 33 which is adapted to enter a recess 34 in the front face of the front cross bar 2 of the platform A, such recess being open at its bottom and having a laterally extending horizontal portion 35 at its upper end so as to form a stop or shoulder 36 over which the free end of the locking member 33 engages. When the platform is raised from the dotted lines shown in Fig. 4 to the full line position, the elevator and all the parts carried thereby swing upwardly and forwardly, as does the front bar 4 of the platform, and during this upward movement the rear extremity of the member 33 enters the slot 34 in the bar 2 and rides along the inclined edge 34ª of the slot, so that, during the latter part of the upper movement of the platform the member 33 is moved from the position shown in Fig. 5 almost to that shown in Fig. 6 but not far enough to withdraw the bolt 21 from engagement with the links E. This movement of the member 33 is resisted by the springs 22 for the bolts 21, and as soon as the upper part of the slot 34 is reached, the member 33 snaps into the horizontal portion 35 of the slot by reason of the expansion of the springs 22 of the bolts 21. As long as the locking member 33 is thus engaged the platform will sustain a load, and when the operator pushes the foot lever 25 the locking member 33, which is a part of such foot lever, is disengaged from the wall 36 of the slot 34, and consequently the loaded platform will move downwardly, and during this movement the elevator can be retained in a vertical position, as shown in Fig. 1, since the bolts 21 were released from the links E by the operator actuating the foot lever 25. It will be noted that the rear end of the member 33 swings on an arc of a circle struck from the axis of the front axle, which is approximately co-incident with the pivot studs 13 of the elevator F, and the front part of the platform swings on approximately the same center, and during the upward swinging of the member 33 and bar 2 the free extremity of the locking member 33 will enter the recesses 34, as hereinbefore explained, to lock the platform in raised positions.

It is necessary that the king pin be maintained in vertical position during the movement of the truck, as otherwise it would be difficult to steer the same. Thus, when the platform is lowered, as shown in Fig. 1, the king pin is in a vertical position, which enables the truck to be readily steered under the load which the truck is about to take up, it being understood that the load is usually supported by skids or the like a suitable height above the floor, so that the truck can be wheeled under the load, such a load-supporting skid being shown by dotted lines in Fig. 2. When the load is to be raised, the elevator is swung backwardly from a position shown in Figs. 1 and 11 to the position shown by dotted lines in Fig. 4, and that shown in Fig. 10. When the elevator is in this position the bolts 21 automatically lock with the front links E. The elevator is now raised from the position shown in Fig. 10 to that shown in Figs. 2 and 9, whereby the load is elevated and the platform carrying it locked in raised position automatically. The guiding or steering of the truck is accomplished by a handle or tongue G which is detachably engaged in a forward extension or arm 38 on the axle block 30. In the socket 39 of this extension 38 is a fixed transverse pin 40, and the tongue has a longitudinal slot 41, which slot has an opening 42 in its side, so that the tongue can be engaged with or disengaged from the pin. The tongue has a transversely extending pin or oppositely disposed lugs 43 which are adapted to be engaged in recesses or seats 44 on the forward part of the extremity 38. When the lugs 43 are engaged with the seats 44 the tongue is operatively connected with the fore carriage so as to steer truck, but by pulling the tongue forwardly to disengage the lugs 43 from the seats 44, the tongue can be swung upwardly about the pin 40 as a center in order that the tongue or handle can assume the vertical position shown in Fig. 1, where lack of space so requires, as in an elevator into which the truck is conducted for carrying a load from one floor of a building to another. Furthermore, the handle G can be removed altogether if necessity requires.

A checking device H is employed to check the descent of the loaded platform, such device being a dashpot of any approved construction supported on the bar 8ª, and the movable element 45 of the dashpot is connected by a link or other means 46 with the front bar 2 of the platform. This dashpot is so designed as to allow the platform to be readily elevated, but materially retards the descent of the platform, even though it is loaded.

From the foregoing description taken in connection with the accompanying drawings, the advantages of the construction and method of operation will be readily understood by those skilled in the art to which the invention appertains, and while we have described the device which we now consider to be the best embodiment thereof, we desire to have it understood that the device shown is merely illustrative, and that such changes may be made when desired as are within the scope of the appended claims.

Having thus described our invention, we claim as new and desire to secure by Letters Patent:

1. An elevating truck comprising a platform, an under supporting structure, links connecting the platform with the under structure and permitting the platform to be raised and lowered, a swinging elevating device, means for detachably connecting the device with the links to raise the platform, a wheeled steering fore carriage connected with the said device, and a handle connected with the forecarriage to guide the movement of the truck and to swing the elevating device.

2. An elevating truck comprising a platform, an under supporting structure including rear wheels, an elevating device connected with the under structure and mounted to swing on a horizontal axis, members pivotally connected with the device and the platform, a fore carriage pivotally connected with the elevating device, a steering handle connected with the forecarriage and serving to swing the said elevating device, and means carried by the elevating device for operatively connecting the same with the said members for raising the platform and releasable to permit the platform to lower independently of the elevating device.

3. An elevating truck comprising a wheel-supported under structure, a platform, links connecting the platform with the under structure, an elevating device connected with the under structure and detachably connected with the links for raising the platform, a handle pivotally connected with the elevating device for guiding the truck, and means for rigidly connecting the handle with the elevating device, whereby the handle operates through the latter to elevate the platform.

4. An elevating truck comprising a wheel-supported under structure, a platform movably mounted on the under structure, an elevating device connected with the under structure to swing on a horizontal axis, members pivotally connected with the device and platform, locking means for connecting the elevating device with the members to raise the platform, and locking means on the elevating device for automatically engaging and holding the platform in raised position.

5. An elevating truck comprising a wheel-supported under structure, a platform movably mounted on the under structure, an elevating device connected with the under structure to swing on a horizontal axis, members pivotally connected with device and platform, locking means for connecting the elevating device with the members to raise the platform, locking means on the elevating device for automatically engaging and holding the platform in raised position, and a foot-operated means for simultaneously releasing all of said locking means to permit the platform to be lowered.

6. An elevating truck comprising a wheel-supported under structure, a platform, links for connecting the platform with the under structure, an elevating device pivotally connected with the under structure to swing on a horizontal axis, locking bolts carried by the elevating device and adapted to interlock with the links to raise the platform by the movement of the elevating device, and means for releasing the locking bolts from the links to permit the platform to lower.

7. An elevating truck comprising a wheel-supported under structure, a platform, links for connecting the platform with the under structure, an elevating device pivotally connected with the under structure to swing on a horizontal axis, locking bolts carried by the elevating device and adapted to interlock with the links to raise the platform by the movement of the elevating device, an operating device to which the said locking bolts are connected, and a member carried by the operating device and arranged to interlock with the platform when the latter is raised for maintaining such position, said member and locking bolts being simultaneously released by the operating device to permit the platform to lower.

8. An elevating truck comprising a wheel-supported under structure, a platform, sector-shaped links connecting the platform and under structure together, an elevating device disposed between the said links, means carried by the elevating device for automatically interlocking with the links, whereby the elevating device can, in swinging, raise or lower the platform, and means adapted to be actuated by the operator for releasing the said interlocking means from the said links.

9. An elevating truck including an under supporting structure, a platform, links pivotally connecting the platform and under structure together, an elevating device connected with the under structure and arranged to swing on an axis co-incident with the connection between the links and under structure, stops on the links between which the elevating device can swing, spring-pressed locking bolts on the elevating device arranged to engage with the links, whereby the movement of the elevating device will raise the platform, and means for releasing the locking bolts from the links to permit the platform to lower.

10. An elevating truck including an under supporting structure, a platform, links pivotally connecting the platform and under structure together, an elevating device connected with the under structure and arranged to swing on an axis co-incident with the connection between the links and under structure, stops on the links between which the elevating device can swing, spring-pressed locking bolts on the elevating device arranged to engage with the links, whereby the movement of the elevating device will raise the platform, means for releasing the locking bolts from the links to permit the platform to lower, a fore carriage, and a king pin connection between the fore carriage and the said elevating device.

11. An elevating truck comprising an under structure including reach bars, a platform disposed above the bars, a swinging elevating device, links pivotally connected with the platform, pivotal connections between the links and reach bars and elevating device, means for releasably locking the elevating device and links together for raising the platform, and steering wheels connected with the elevating device.

12. An elevating truck comprising an under supporting structure having rear wheels, a platform, front and rear links connecting the platform and under structure together, an elevating device disposed between the front links and having depending members pivotally connected with the front links, front wheels disposed between the said members of the elevating device, an axle supporting the said front wheels, a king pin connection between the axle and elevating device, locking bolts on the elevating device for engaging with the links to raise the platform by the movement of the said elevating device, and a steering tongue or handle connected with the axle to steer the truck.

13. An elevating truck including a wheel-supported under structure, a platform, links connected with the platform, an elevating device having pivot studs to which the links and under structure are connected, means for locking the links and elevating device together to raise the platform by the said device, means for releasing the said means to permit the platform to lower independently of the said device, and a steering fore carriage connected with the said elevating device.

14. An elevating truck comprising a wheel-supported under structure including a front axle, wheels on the front axle, a forward extension on the axle and formed with a socket, a pin extending across the socket, seats on the forward portion of the extension, a steering handle detachably engaged in the said extension and having an open-sided slot for receiving the pin in the socket of the extension, and means on the steering handle to engage with the seat on the extension to rigidly connect the steering handle with the axle.

In testimony whereof we have signed our names to this specification in the presence of two subscribing witnesses.

EUGENE M. CHAPMAN.
CHARLES E. COWAN.

Witnesses:
URBAN JOHN ERNST,
GEORGE AHNERT.